(12) United States Patent
Worup et al.

(10) Patent No.: US 8,640,806 B2
(45) Date of Patent: Feb. 4, 2014

(54) TRANSPORT MEANS AND A VEHICLE

(75) Inventors: Rasmus Worup, Odder (DK); Mikkel Steen Pedersen, Silkeborg (DK)

(73) Assignee: Ecomove ApS, Horsens (DK)

( * ) Notice: Subject to any disclaimer, the term of this patent is extended or adjusted under 35 U.S.C. 154(b) by 0 days.

(21) Appl. No.: 13/395,901

(22) PCT Filed: Sep. 14, 2010

(86) PCT No.: PCT/DK2010/050233
§ 371 (c)(1),
(2), (4) Date: Mar. 14, 2012

(87) PCT Pub. No.: WO2011/032560
PCT Pub. Date: Mar. 24, 2011

(65) Prior Publication Data
US 2012/0181806 A1    Jul. 19, 2012

(30) Foreign Application Priority Data
Sep. 15, 2009   (DK) ................................ 2009 70111

(51) Int. Cl.
*B60G 9/02* (2006.01)
*B60G 11/113* (2006.01)

(52) U.S. Cl.
USPC ................. 180/209; 180/24.02; 280/124.116; 267/266; 267/41

(58) Field of Classification Search
CPC .................................................. B60G 2300/40
USPC .............. 267/266, 41; 180/209, 24.02, 24.01; 280/124.171, 124.101, 124.11, 280/124.165, 137.5, 124.116, 124.128
See application file for complete search history.

(56) References Cited

U.S. PATENT DOCUMENTS

| | | | |
|---|---|---|---|
| 2,921,812 A * | 1/1960 | Barenyi | 296/204 |
| 3,429,566 A | 2/1969 | Rosendale | |
| 4,061,362 A * | 12/1977 | Bufler | 280/124.106 |
| 4,557,500 A * | 12/1985 | Collard et al. | 280/124.145 |
| 4,639,008 A * | 1/1987 | Krettenauer et al. | 280/405.1 |
| 4,763,953 A * | 8/1988 | Chalin | 298/17 S |
| 6,073,946 A * | 6/2000 | Richardson | 280/86.5 |
| 6,688,586 B1 | 2/2004 | Moore | |
| 7,441,809 B1 * | 10/2008 | Coombs et al. | 280/785 |
| 7,527,117 B2 * | 5/2009 | Strong | 180/209 |
| 8,033,565 B2 * | 10/2011 | Holroyd | 280/676 |

(Continued)

FOREIGN PATENT DOCUMENTS

| | | |
|---|---|---|
| CH | 214077 | 3/1941 |
| DE | 1219340 | 6/1966 |

(Continued)

*Primary Examiner* — Karen Beck
(74) *Attorney, Agent, or Firm* — James Creighton Wray

(57) ABSTRACT

A transport means (1) comprising: —at least two wheels (2), —a chassis (3) with a longitudinal axis, which is substantially parallel to a direction of travel of the transport means (1), and —at least one suspension system (4) operationally positioned between the chassis (3) and the wheels (2), wherein each wheel (2) has a wheel rotation axis (5), which is substantially horizontal, wherein the suspension system (4) includes a connection means (22) that interact releasably with a connection means (23) on the chassis (3), and wherein the suspension system (4) has a first orientation, wherein the suspension system (4) has at least one other orientation which is rotated in relation to the first orientation about a suspension rotation axis (6), which is substantially horizontal and perpendicular to the longitudinal axis of the chassis (3).

14 Claims, 15 Drawing Sheets

(56) References Cited

U.S. PATENT DOCUMENTS

| | | | |
|---|---|---|---|
| 2001/0038188 A1* | 11/2001 | Fabris | 280/124.11 |
| 2002/0113399 A1* | 8/2002 | Fehler et al. | 280/124.165 |
| 2002/0130479 A1* | 9/2002 | Eckelberry et al. | 280/124.109 |
| 2005/0236796 A1* | 10/2005 | Halonen | 280/124.128 |
| 2006/0032671 A1 | 2/2006 | Arzberger | |
| 2006/0254840 A1* | 11/2006 | Strong | 180/190 |
| 2006/0254841 A1* | 11/2006 | Strong | 180/190 |
| 2009/0020351 A1* | 1/2009 | Chun et al. | 180/209 |
| 2009/0205885 A1* | 8/2009 | Strong | 180/24.02 |
| 2011/0198137 A1* | 8/2011 | De Paschoal | 180/65.1 |
| 2012/0049478 A1* | 3/2012 | Ahuja et al. | 280/124.101 |

FOREIGN PATENT DOCUMENTS

| | | |
|---|---|---|
| DE | 3243434 | 5/1984 |
| EP | 0213367 | 3/1987 |
| EP | 0246772 A1 | 11/1987 |
| FR | 2529839 | 1/1984 |
| JP | 2005 225450 | 8/2005 |

* cited by examiner

TRANSPORT MEANS AND A VEHICLE

This application claims the benefit of Danish Application No. PA 2009 70111 filed Sep. 15, 2009 and PCT/DK2010/050233 filed Sep. 14, 2010, International Publication Number WO 2011/032560 A1, which are hereby incorporated by reference in their entirety as if fully set forth herein.

FIELD OF THE INVENTION

The present invention relates to a transport means comprising;
 at least two wheels,
 a chassis with a longitudinal axis, which is substantially parallel to a direction of travel of the transport means, and
 at least one suspension system operationally positioned between the chassis and the wheels, wherein each wheel has a wheel rotation axis, which is substantially horizontal, wherein the suspension system includes a connection means that interact releasably with a connection means on the chassis, and wherein the suspension system has a first orientation.

BACKGROUND OF THE INVENTION

A wheeled transport means as specified in the introduction is provided with a suspension system. A suspension system is normally provided for each wheel and usually includes a spring element a damper element, and linkages. These spring, damper and linkage elements define the suspension characteristics and the handling qualities of the transport means, and as such needs to be tailored for the specific transport means.

Additionally the transport means may have a different type of suspension system on each wheel, e.g. on the front compared to the rear wheels.

The main purpose of the suspension system is to ensure continuous grip between the surface upon which the transport means travel and the wheels, and to protect the passengers, cargo and the transport means itself from damage and wear caused by shock and vibration transferred through the wheels and the suspension system to the chassis and caused by unevenness of the surface, which the transport means travel upon.

An important factor is the spring rate, which is defined by the force which the spring exerts divided by the displacement of the spring from equilibrium state. A spring with a small spring rate is "soft" and a spring with a high spring rate is "harder".

A soft spring needs to be relatively long compared to a hard spring, when carrying the same load in order to avoid that the spring reaches the limit of stroke.

A too soft spring will cause a lag in the control input to the steering of the transport means, which will decrease the handling qualities of the transport means because the steering become sluggish. On the other hand a too hard spring will cause control input with a small lag, which also will decrease the handling qualities of the transport means because the steering become over sensitive.

A too soft spring in a passenger transport means will decrease the comfort of the passengers, because the deflection of the spring is relatively large when subject to an uneven surface, whereas the shock and vibration will remain if the spring is too hard.

Further to the characteristics of the spring; the damper and the physical properties and dimensions of the entire suspension system, is also important, but will not be described further here.

As can be seen from the above the design of a suspension system for a transport means is a trade-off between many design parameters.

From EP 0 246 772 there is known a suspension system with a spring and shock absorber between the vehicle body and each wheel. The shock absorber is electromagnetically switchable between soft and stiff settings. The system employs accelerometers for sensing the vertical acceleration of the vehicle body and control means for switching the setting of the shock absorbers. This suspension system caters for different operating conditions. However, the suspension system is complex and requires the electrical system of the vehicle to perform reliably.

For multipurpose vehicles the design of the suspension system will be a compromise that may not be optimal for the complete operational envelope of the vehicle, unless a very complex suspension system is provided. However, it is desirable to reduce the number of parts in the suspension system especially for multipurpose vehicles to reduce the failure rate.

From U.S. Pat. No. 4,557,500 there is known a suspension system with a reduced parts count consisting of an elastic leaf made of composite material. The elastic leaf may be mounted transversely and supporting two wheels. The elastic leaf element provides the spring of the suspension system. The leaf may consist of fibres extending longitudinally, without being cut, from one end to the other, embedded in an appropriate binder. Although this system provides and improvement with regards to a reduction of parts count the spring characteristics of the suspension does not cater for changing operating conditions.

The problem is not only confined to multi purpose vehicles, but include all transport means, which operate under changing conditions, like trucks and trailers which may operate loaded or empty, a car which need to operate satisfactorily off-road as well as on the road.

US 2006/0032691 A1 disclose a vehicle with a suspension system that is rotatable about a suspension rotation axis between two extreme positions. The wheelbase of the vehicle can hereby be adjusted. When travelling along a horizontal surface the wheelbase is kept at its short setting to maximize the zero turn capability and therefore enhanced manoeuvrability. When the vehicle is travelling along a sloping surface the wheelbase is increased to maintain the overall balance of the vehicle.

U.S. Pat. No. 6,688,586 B1 disclose a leaf spring type suspension system. The leaf spring comprises a plurality of leaf finger that may be pre-tensioned individually by forming the fingers in the free condition. This provides multiple spring rates. The purpose of which is to provide a soft suspension, when the vehicle is lightly loaded and a stiffer suspension, when the vehicle is fully loaded. This system is not suitable for frequent changing of the spring rate, as the leaf fingers are deformed to change the spring rate. Therefore the leaf fingers are prone to fatigue failure.

OBJECT OF THE INVENTION

The object of the present invention is to provide a multi-purpose suspension system, which can be used with a wide variety of transport means, especially multi-purpose vehicles and vehicles with changing operating conditions.

DESCRIPTION OF THE INVENTION

According to the present invention, this is achieved by a transport means of the type specified in the introduction and which is peculiar in that, the suspension system has at least one other orientation rotated in relation to the first orientation and about a suspension rotation axis, which is substantially horizontal and perpendicular to the longitudinal axis of the chassis and that the rotation angle of the suspension system about the suspension rotation axis is 180°, 120°, 90°, 72° or 60°.

It is further achieved by a transport means according to the invention, which comprises a body, where the body is interchangeably attached to said transport means The term "transport means" in the present application include but is not limited to; a vehicular construction comprising at least one pair of wheels, a chassis and at least one suspension system.

The term "vehicle" in the present application include but is not limited to cars, trucks, carriages, trailers, all terrain vehicles, construction equipment, multi-purpose vehicles, modular vehicles with different configurations to accommodate several different types of bodies with different missions.

The transport means may employ endless tracks, skids or skis as an alternative to wheels.

At least one suspension system is connected to two wheels and the chassis of the transport means, where said at least one suspension system is positioned between the wheels and the chassis. The connection means on the suspension system and the chassis are provided in such a way that the suspension system is releasably connected to the chassis and can thus be reattached. The connection means can include a bolt, screw, latch or other type of fastening means. In a typical construction each pair of wheels will be connected to a suspension system and the suspension system is releasably attached to the chassis.

When the suspension is rotated to an other orientation in relation to its first orientation it is possible to change the characteristics of the suspension by design.

The spring rate may be designed such that it changes as the suspension system is rotated about the suspension rotation axis. The same suspension system may therefore have orientations where it is either soft or hard. The rotation may be stepped or step less.

It is possible to adjust the anti-diving effect during braking and acceleration of the transport means, by setting up the orientation of the wheels individually. The skilled person is able to perform this operation based on the information disclosed within this application.

The material used for the suspension system may be metal, plastics or composites. The selected material shall have spring characteristics, i.e. be able to return to an original position after being deformed.

The wheel rotation is substantially horizontal. However a camber angle may be applied. The camber angle usually falls within +/−5° for a suspension without static or dynamic loading.

The axis around which said rotation takes place is called the suspension rotation axis.

It is herewith achieved that the characteristics of the suspension system may be changed in an easy way to cater for different requirements from the transport means.

For instance the suspension can be relatively soft in its first orientation and relatively hard in its at least one other orientations, thus the travel of the suspension system change upon rotation, e.g. more travel in the first orientation and less travel in its at least one other orientation.

An example of such use may be a vehicle which is be configured as a passenger transport or as a passenger transport pulling a caravan. For the first use a relatively soft suspension is desirable to provide comfort for the passengers, but for the second use a relatively hard suspension is desired to limit the travel of the suspension when the load from the caravan is applied.

By designing the suspension system such that it is releasably attached to the chassis and rotatable between the first and other orientations it is possible to cater for both situations by making the suspension relatively soft in one direction and relatively hard in the other direction.

The difference in suspension characteristics is achieved by carefully designing the suspension system with shape and material that achieves the wanted effect.

The orientation of the suspension system can for instance be changed by a mechanic or the operator of the transport means.

It is herewith achieved that the transport means can function as the base for several different types of vehicles. Additionally if the vehicle is of a modular construction the same transport means can be used for a vide variation of vehicle types, and the suspension system can be readily rotated and changed to supply the vehicles with the right suspension characteristics and ground clearance.

The transport means is especially suited for modular vehicles, where different bodies may be applied to the same transport means. The suspension system may have a first orientation where it is soft and at least one orientation where it is hard. The suspension may have a first orientation where the chassis ground clearance is low and at least one other orientation where the chassis ground clearance is high.

The suspension system may have a first orientation combining soft spring with high ground clearance and hard spring with low ground clearance and vice versa.

It is herewith achieved that the same transport means with a chassis and suspension system, may be configured with a body for a vehicle type requiring a soft suspension, such as a passenger vehicle, and later reconfigured with a body for a vehicle type requiring a hard suspension, such as a cargo vehicle.

Furthermore it is achieved that the same transport means with a chassis and suspension system, may be configured with a body for a vehicle type requiring a small ground clearance, such as a road vehicle, and later reconfigured with a body for a vehicle type requiring a bigger ground clearance, such as an off-road vehicle.

It is also achieved that the same transport means with a chassis and suspension system, may be configured with a body for a vehicle type requiring a small ground clearance and a hard suspension, such as a sports road vehicle, and later reconfigured with a body for a vehicle type requiring a bigger ground clearance and a soft suspension, such as an off-road vehicle.

The transport means according to the invention is thereby permits a modular vehicle concept where the same transport means is used for different vehicle configurations.

A rotation angle of 120° will provide three orientations of the suspension system about the suspension rotation axis, a rotation angle of 90° will provide four orientations of the suspension system about the suspension rotation axis, a rotation angle of 72° will provide five orientations of the suspension system about the suspension rotation axis, a rotation angle of 60° will provide six orientations of the suspension system about the suspension rotation axis and so forth.

According to a further embodiment, the transport means according to the invention is peculiar in that, the other orientation is rotated 180° in relation to the first orientation about the suspension rotation axis.

It is herewith achieved that the transport means has two possible modes of operation using the same suspension system.

When the suspension is rotated 180° in relation to its first orientation it is possible to change the characteristics of the suspension by design.

Additionally the suspension systems connection means is provided in such a way that the suspension system can be released from the chassis and rotated 180° about a suspension rotation axis and then reattached to the chassis.

According to a further embodiment, the transport means according to the invention is peculiar in that, a projected absolute vertical distance between the suspension rotation axis and the wheel rotation axis is greater than 0.

It is herewith achieved that ground clearance of the transport means may be changed. The ground clearance of the transport means may be increased gradually by rotating the suspension system gradually to other orientations.

Since the distance between the ground and the wheel rotation axis is substantially constant, and due to the fact that the suspension system is connected to the chassis with an absolute projected vertical distance between the suspension rotation axis and the wheel rotation axis, which is greater than 0, a change in suspension orientation will result in a change in the cassis height relatively to the bearing surface.

This in turn means that the same transport means can be used for different purposes, e.g. an off-road vehicle with high ground clearance can be turned into a road vehicle with lower ground clearance simply by changing the orientation of the suspension system. A lower ground clearance may improve handling qualities. Furthermore a lower ground clearance may reduce drag.

The change in ground clearance can also be used in connection with the change of seasons, such that a low ground clearance can be used when the roads are clear and a higher ground clearance is used when the roads are covered with snow.

The change in ground clearance can also be used for lorries which need to clear low bridges. The ground clearance can be changed from a high position to a low position by changing the orientation of the suspension. When the bridge is cleared the ground clearance can be changed back to the high position by changing back the orientation of the suspension.

Alternatively when changing the orientation of the suspension system 180°, the orientation of the projected vertical distance between the suspension rotation axis and the wheel rotation axis will also change 180°.

According to a further embodiment, the transport means according to the invention is peculiar in that, the suspension system material is chosen among fibre reinforced plastics and metal.

It is herewith achieved that it is possible to manufacture the suspension system as one single element integrating the spring and linkage. This provides a significant reduction in complexity and parts count compared to current suspension systems.

Composite materials have a high strength to weight ratio, therefore the weight of a suspension system manufactured from composite materials may be lighter than a suspension system of metal. Furthermore it is possible to achieve complex shapes with composite material moulding.

Alternatively the suspension system may comprise a plurality of parts which are either glued or bolted together depending on the complexity of the composite mould lay-up. However the parts count may still be significantly reduced compared to a conventional suspension.

The composite material consists of a matrix material and a reinforcement material. The matrix holds the reinforcement material in place and the reinforcement material provides mechanical properties to enhance the properties of the matrix.

For fibre reinforced plastics the matrix material may be a polymer and the reinforcement material may as an example be fibres of glass, carbon or aramid.

The fibres may be obtained as a weaved cloth. The cloth is obtainable in different styles such as plain weave, unidirectional or twill. The different styles of weave have different properties in tension and compression. By choosing the weave and orientation of the fibres it is achievable to obtain structural elements which have different spring rates dependent on the direction of displacement.

Twill is a material which provides structural elements with a small spring rate in tension, i.e. soft spring and unidirectional is a material which provides structural elements with a high spring rate in tension, i.e. a hard spring.

As an example the suspension system may have twill weave on one side and unidirectional weave on the other side.

With the twill side down the twill weave will be in tension during loading on the suspension system and the unidirectional weave will be in compression. This provides a small spring rate and a "soft" suspension.

With the unidirectional side down the unidirectional weave will be in tension during loading on the suspension system and the twill weave will be in compression. This provides a high spring rate and a "hard" suspension.

As can be seen the same suspension system may have different spring rates dependent on the orientation.

According to a further embodiment, the transport means according to the invention is peculiar in that, the said at least one suspension system comprises two separate suspension elements each operationally positioned between the chassis and one of the wheels within said at least one pair of wheels.

It is herewith achieved that one suspension element can be attached per wheel, thus enabling separate suspension for each wheel. Separating the suspension system results in an independent suspension on the wheels. Independent suspension systems increase the passenger comfort, as the reaction of the wheels become independent.

According to a further embodiment, the transport means according to the invention is peculiar in that, the suspension element is a substantially U-shaped element, where the base of the U is oriented towards the chassis, where the free ends of the U is oriented towards a wheel, and where the legs of the U is located one above the other.

It is herewith achieved that the suspension element functions as both a spring as well as a wishbone providing connection means to the wheel. Additionally breaking elements as well as steering elements can be housed within the legs of the U-shaped element. The U-shaped element can be produced such to provide different suspension characteristics, e.g. by adjusting the thickness of the used material.

The depth of the U is such that the suspension is able to take up loads in the longitudinal direction of the transport means as well as torsion about the wheel rotation axis, i.e. during acceleration or braking.

According to a further embodiment, the transport means according to the invention is peculiar in that, the said at least one suspension system comprises a transverse elongated element, said transverse elongated element comprising primarily U-shaped suspension elements provided in both ends of said transverse elongated element, where the base of each U is oriented towards the chassis, where the free ends of each U is oriented towards either wheel, and where the legs of the U is located one above the other.

It is herewith achieved that the suspension system provides a dependent suspension for a pair of wheels as well as functions as wishbones providing connection means for said pair of wheels. Additionally breaking elements as well as steering elements can be housed within the legs of the U-shaped element. The U-shaped element can be produced such to provide different suspension characteristics, e.g. by adjusting the thickness of the material used and the moment of inertia of the transverse elongated element, by using different materials, by tailoring the fibreorientation in the matrix, by selection of the fibre cloth design, such as a weave, unidirectional tape or sown cloth.

Furthermore the dependent suspension system can be used on one set of wheels while another said of wheels is in connection with the independent suspension system. This in turn with the ability to rotate the suspension system provides the possibility for many different suspension characteristics using only a few suspension systems.

According to a further embodiment, the transport means according to the invention is peculiar in that, the transport means comprises propulsion means facilitating the rotation of at least one wheel.

It is herewith achieved that the transport means provides its own motive force for propelling the transport means, such that it may move without the application of forces external to the transport means.

The propulsion means may be selected among internal or external combustion engines, electrically powered motors, hydraulic motors or compressed air motors. Additionally the propulsion means can feature a gearbox.

According to a further embodiment, the transport means according to the invention is peculiar in that, the propulsion means comprises at least one electric powered motor, said at least one electric powered motor is provided between the legs of a U-shaped suspension element, and said at least one electric powered engine facilitates the rotation of at least one of the wheels within said at least one pair of wheels.

It is herewith achieved that the transport means can rotate the wheels individually on the wheels where the engines are placed and that a central propulsion means is avoided, thus significantly reducing the complexity of the drive train of the transport means.

The removal of the wheel axle results in a lighter transport means, and thus a more energy efficient transport means. By locating the propulsion means at each wheel the need for differentials no longer exist, which also reduces the complexity of the drive train.

Since the propulsion means is placed near the wheels, and due to having no wheel axle, the chassis can be more compact than on a transport means with a central propulsion means.

The electric fuel cells or batteries can advantageously be provided in a compartment in the bottom of the chassis along the length of the transport means.

According to a further embodiment, the transport means according to the invention is peculiar in that, each suspension system comprises at least one shock-absorber.

It is herewith achieved that the suspension system can be fitted to different suspension characteristics using different types of shock-absorbers, thus providing different damping of the suspension system.

According to a further embodiment, the transport means according to the invention is peculiar in that, the transport means comprises means for automatically rotating the suspension system between the first and said at least one other orientation.

It is herewith achieved that suspension system can be rotated, and therefore the chassis height adjusted or the suspension characteristics changed, without the need of tools or a visit to the mechanic.

This can enable off-road vehicles to be changed into road vehicles when it is needed, e.g. a forester can use his truck in the forest where the ground is uneven and high ground clearance is needed, and when he needs to drive home on regular road he can change the orientation of the suspension system and thus get a better and more economical ride on the way home.

According to a further embodiment, the transport means according to the invention is peculiar in that, the suspension system comprises at least one radius rod.

It is herewith achieved that torsion of the suspension system can be reduced.

According to a further embodiment, the transport means according to the invention is peculiar in that the body is selected among; a body for a one, two, three, four, five, six or more person car, a body for a roadster, a body for a city car, a bus, a truck, a work vehicle, an off road truck or a trailer.

It is herewith achieved that the vehicle may operate according to the immediate requirements of the user.

If a one person car is needed the vehicle will cater for that requirement by allowing the user to attach a one person body. The same vehicle may later be used as a two, three, four, five, six or more person car if that requirement arise or a roadster, a city car, a bus, a truck, a work vehicle, an off road truck or a trailer by simply interchanging the current body on the transport means and/or changing the orientation of the suspension system accordingly.

According to an alternative embodiment, the transport means according to the invention is peculiar in that, the U-shaped element of the suspension system is provided with an L-shaped element near the transition between the base and the legs of the U-shaped element.

It is herewith achieved that said L-shaped element provides progressive spring rate of the suspension system by gradually restricting the movement off the suspension system when the walls of the U-shaped element touch the leg of the L-shaped element due to deformation of the U-shaped element when the suspension system is in use.

DESCRIPTION OF THE DRAWING

The invention will be explained in more detail below with reference to the accompanying drawing, where.

DETAILED DESCRIPTION OF THE INVENTION

Figure 1:
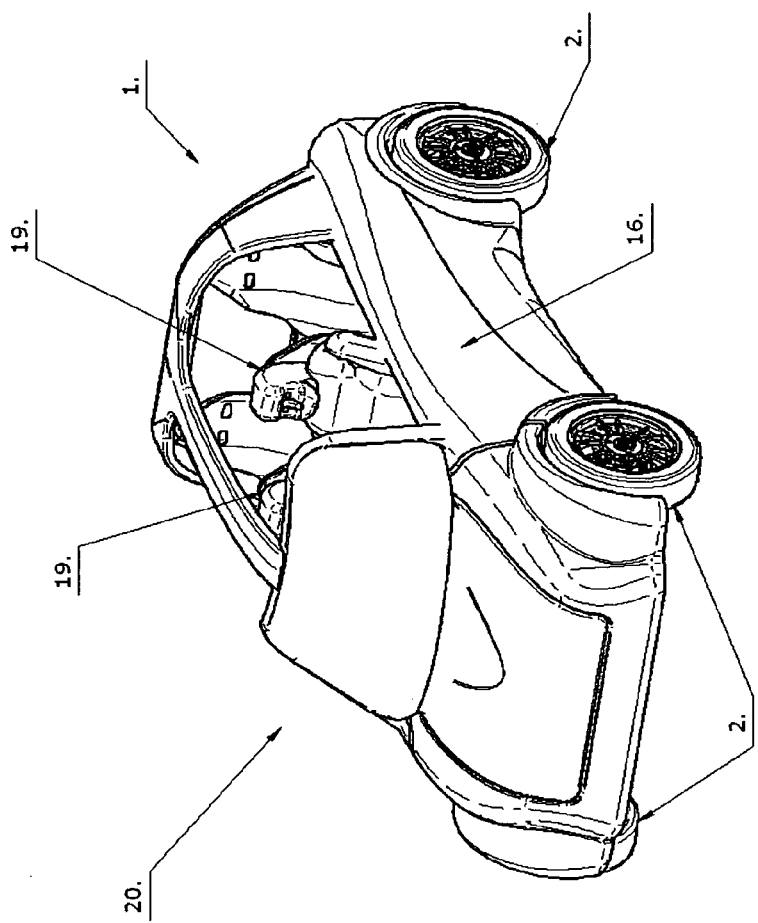
FIG. 1 shows an isometric view of the transport means configured with a body as a four person vehicle.

In the explanation of the figures, identical or corresponding elements will be provided with the same designations in different figures. Therefore, no explanation of all details will be given in connection with each single figure/embodiment.

FIG. 1-5 shows the same transport means 1 configured with different bodies 16 for enclosing one or more passengers 19 and an optional cargo, or for different purposes of use. The transport means 1 and the body 16, with seats and utilities together forms a vehicle 20.

FIG. 1-15 shows a suspension system 4 with a first orientation and an other orientation, which is a second orientation. In the second orientation the suspension system 4 is rotated 180° about the suspension rotation axis 6 in the figures included with the application. The second orientation may be infinitely variable to change the suspension characteristics and/or camber angle.

Figure 8:
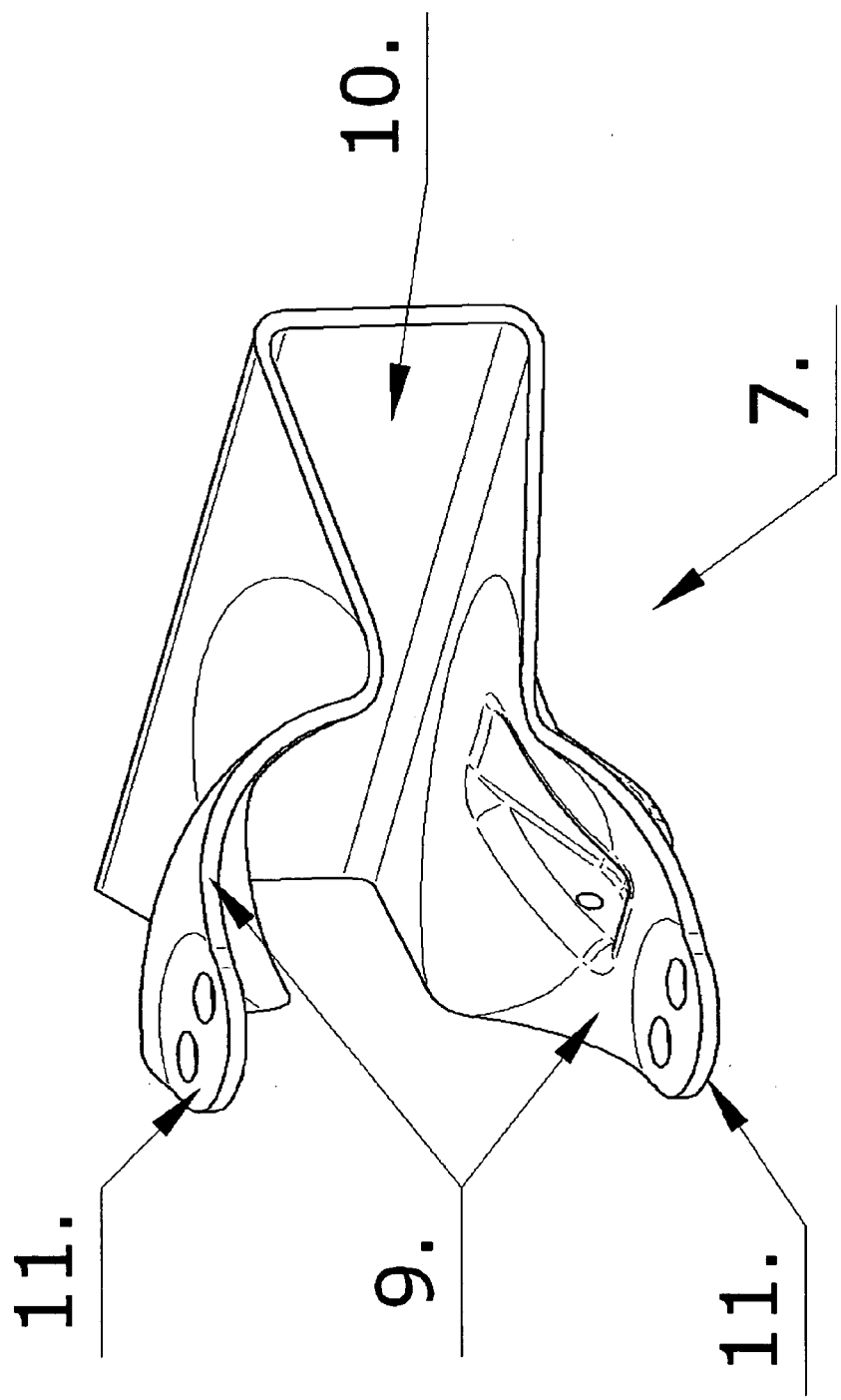
FIG. 8 shows an isometric view of a first embodiment of the suspension system.
Figure 9:
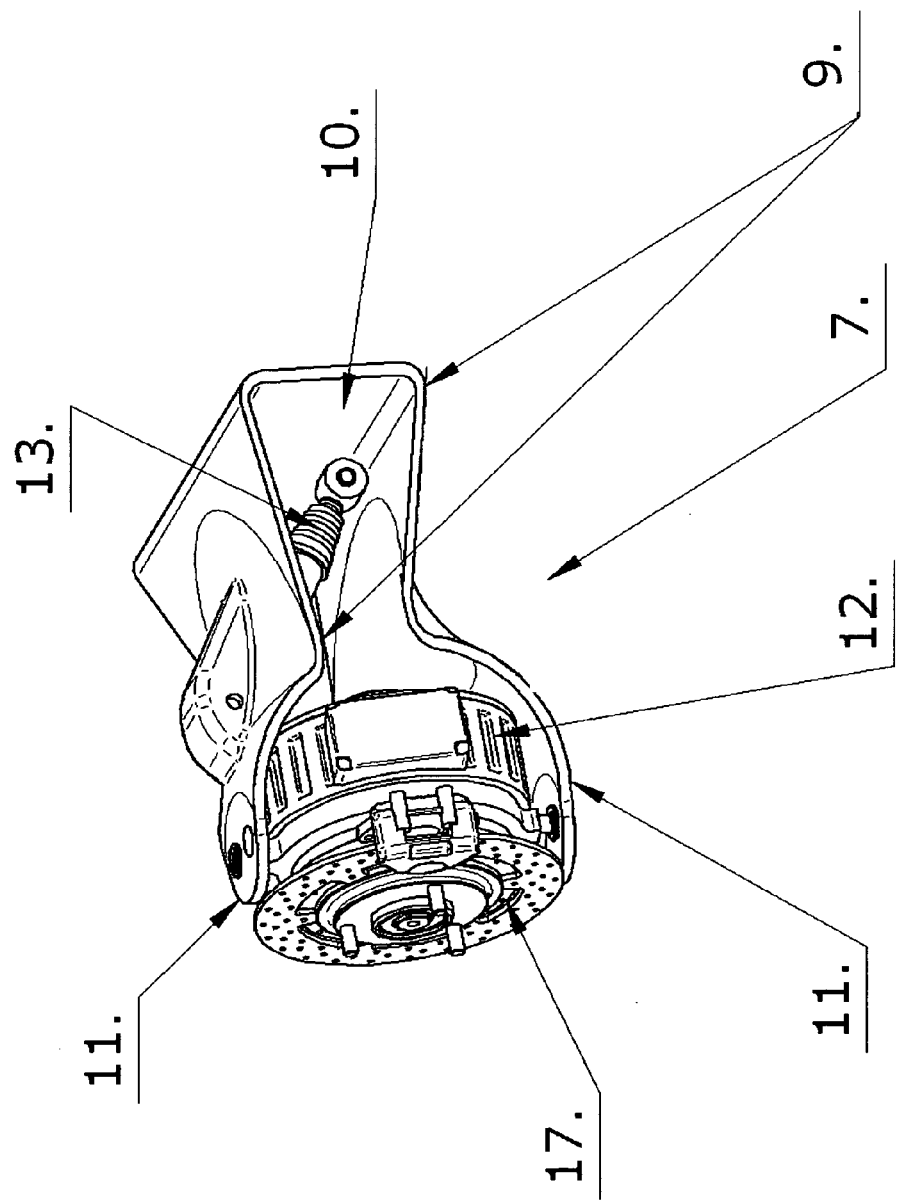
FIG. 9 shows an isometric view of a first embodiment of the suspension system with motor, brakes and shock-absorber.

The transport means comprise four wheels 2 in two pairs, a chassis 3 (see FIGS. 6-7 and 10-11) a suspension system 4 (see FIG. 6-14), propulsion means 12 (see FIGS. 9-11 and 13-14) and brakes 17 (see FIG. 9).

The vehicle 20 configurations shown in FIGS. 1-5 may share the same transport means 1. The different requirements may be catered for by the suspension system 4 (see FIGS. 6 and 10), which has different characteristics dependent on the orientation.

FIG. 1 shows the vehicle 20 configured as a four person vehicle 20. This type of vehicle 20 requires that the suspension system 4 (see FIG. 6-14) of the transport means 1 is relatively soft in order to provide comfort for the passengers 19.

Figure 2:
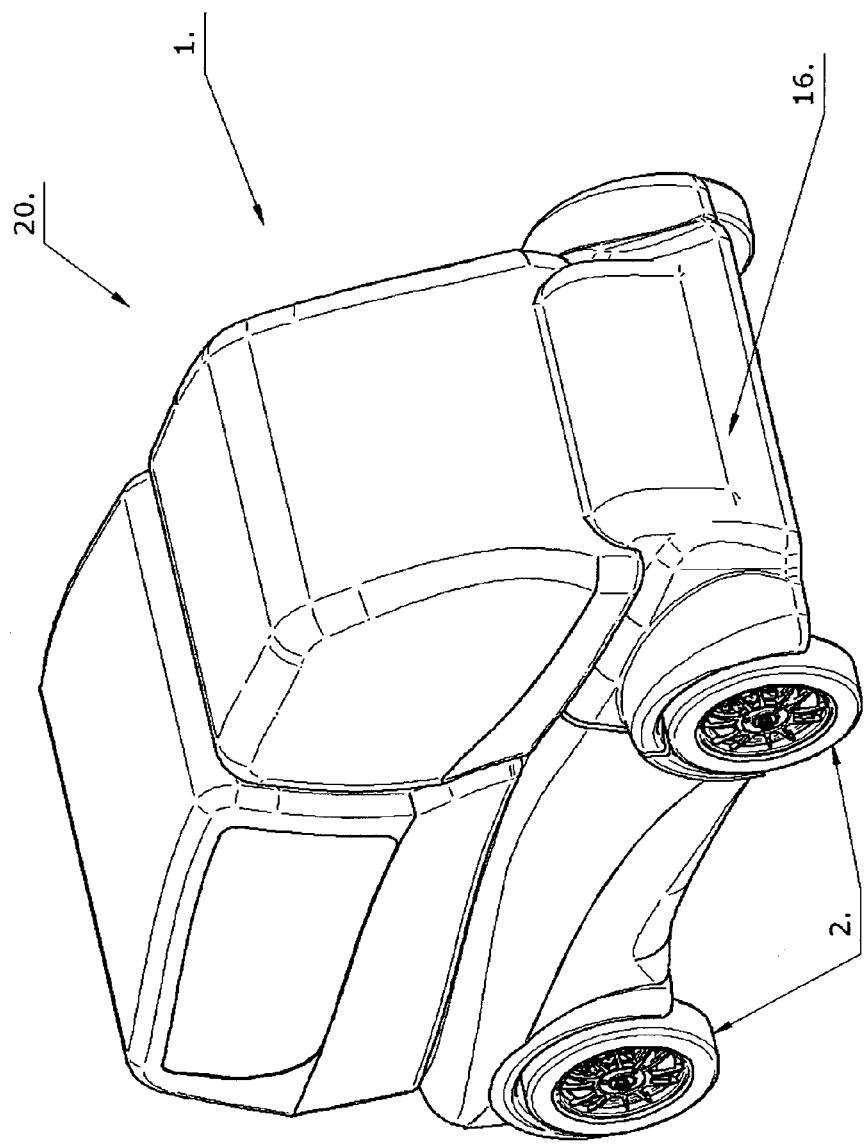
FIG. 2 shows an isometric view of the transport means configured with a body as a lorry.

FIG. 2 shows the vehicle 20 configured as a lorry. This type of vehicle 20 requires that the suspension system 4 (see FIG. 6-14) of the transport means 1 is relatively hard to limit the travel of the suspension system 4 (see FIG. 6-14) under varying loads.

Figure 3:
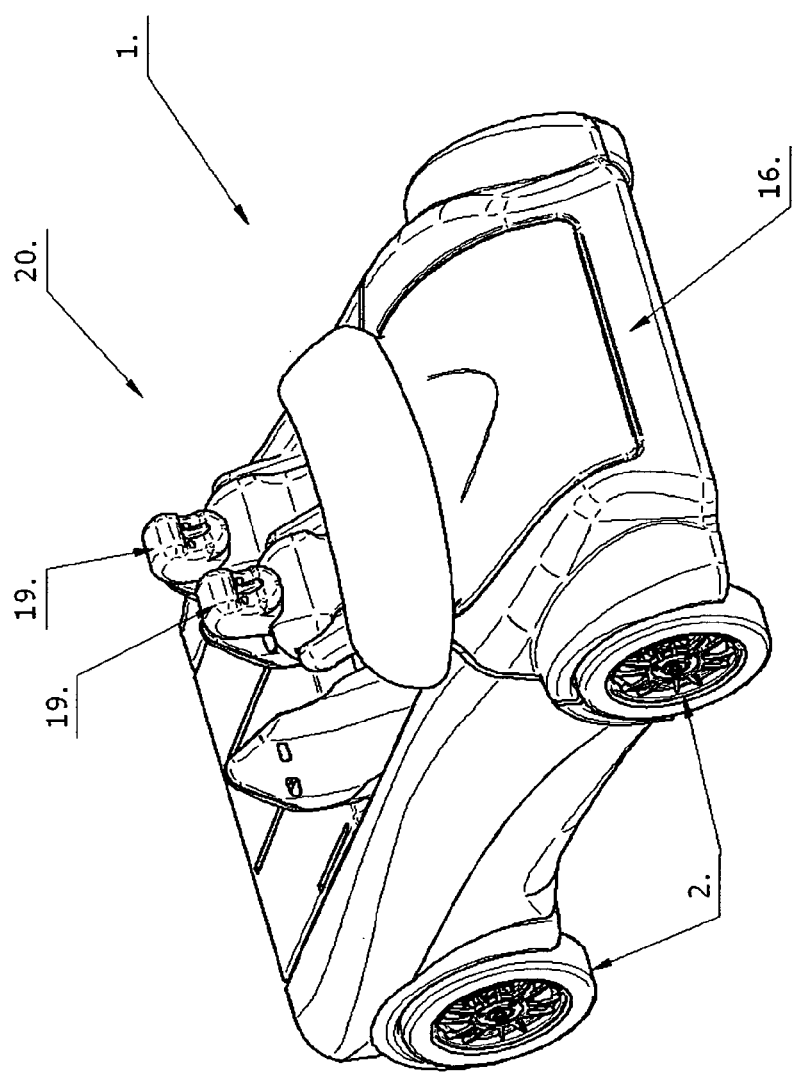
FIG. 3 shows an isometric view of the transport means configured with a body as a sports vehicle with the suspension system in its first orientation.
Figure 4:
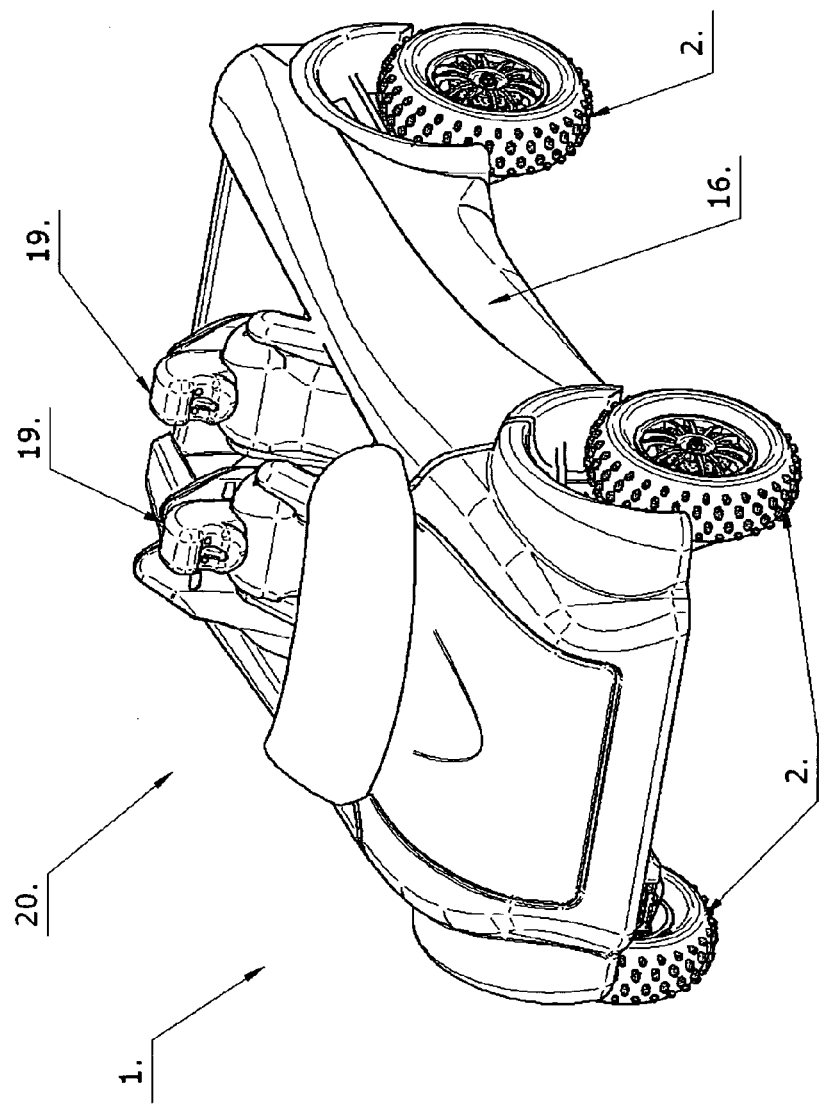
FIG. 4 shows an isometric view of the transport means configured with a body as a sports vehicle with the suspension system in its first orientation.

FIGS. 3 and 4 shows the same vehicle 20 configured as a sports utility vehicle. This type of vehicle 20 requires that the ground clearance may be changed between a road position, where the ground clearance is low as seen in FIG. 3 or an off-road position as seen in FIG. 4. This is achieved by rotating the suspension system 4 (see FIG. 6-14).

In FIG. 3 the suspension system 4 (see FIG. 6-14) is in its first orientation providing a low ground clearance for road use.

In FIG. 4 the suspension system 4 (see FIG. 6-14) is in its second orientation providing a high ground clearance for off-road use.

Figure 5:
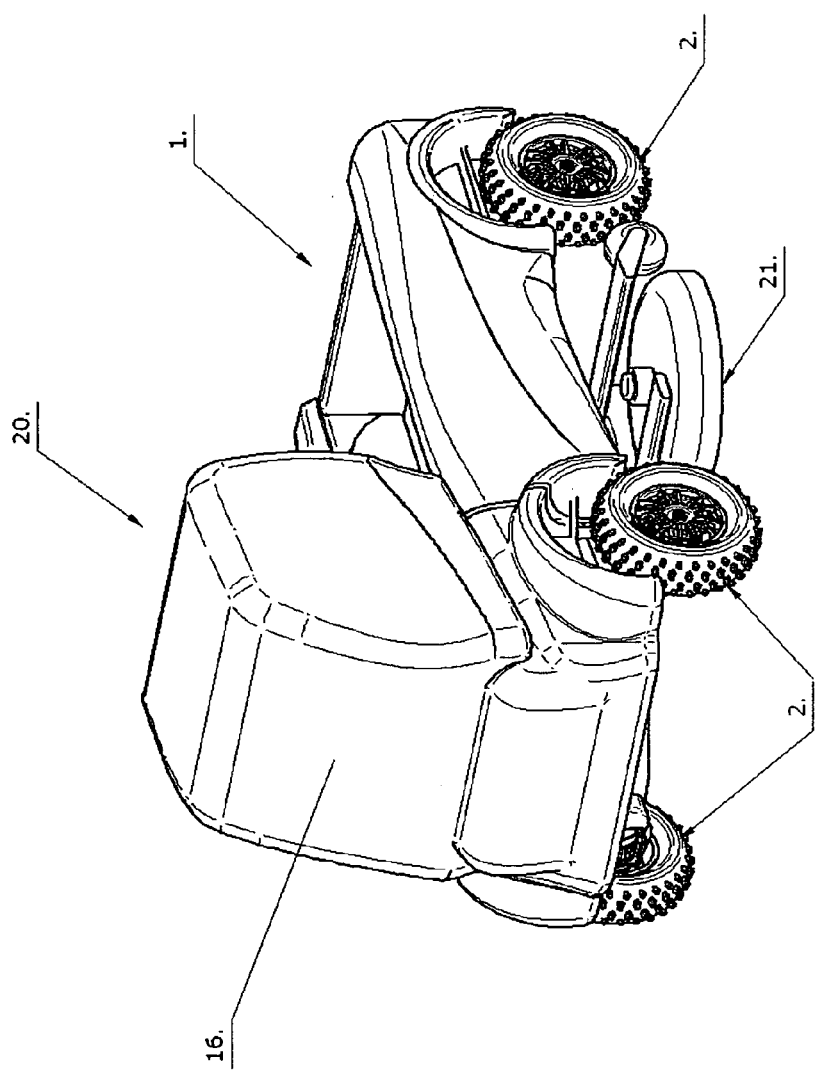
FIG. 5 shows an isometric view of the transport means configured with a body as a garden utility vehicle.

FIG. 5 shows the vehicle 20 configured as a garden utility vehicle. The suspension system 4 (see FIG. 6-14) of the transport means 1 is in its second orientation with high ground clearance. It is thereby possible to use the transport means 1 in a garden utility vehicle 20 with a lawn mover 21.

The same transport means 1 as seen in FIG. 1 to 5 may later be reconfigured into one of the other vehicle types shown in the figures.

Figure 6:
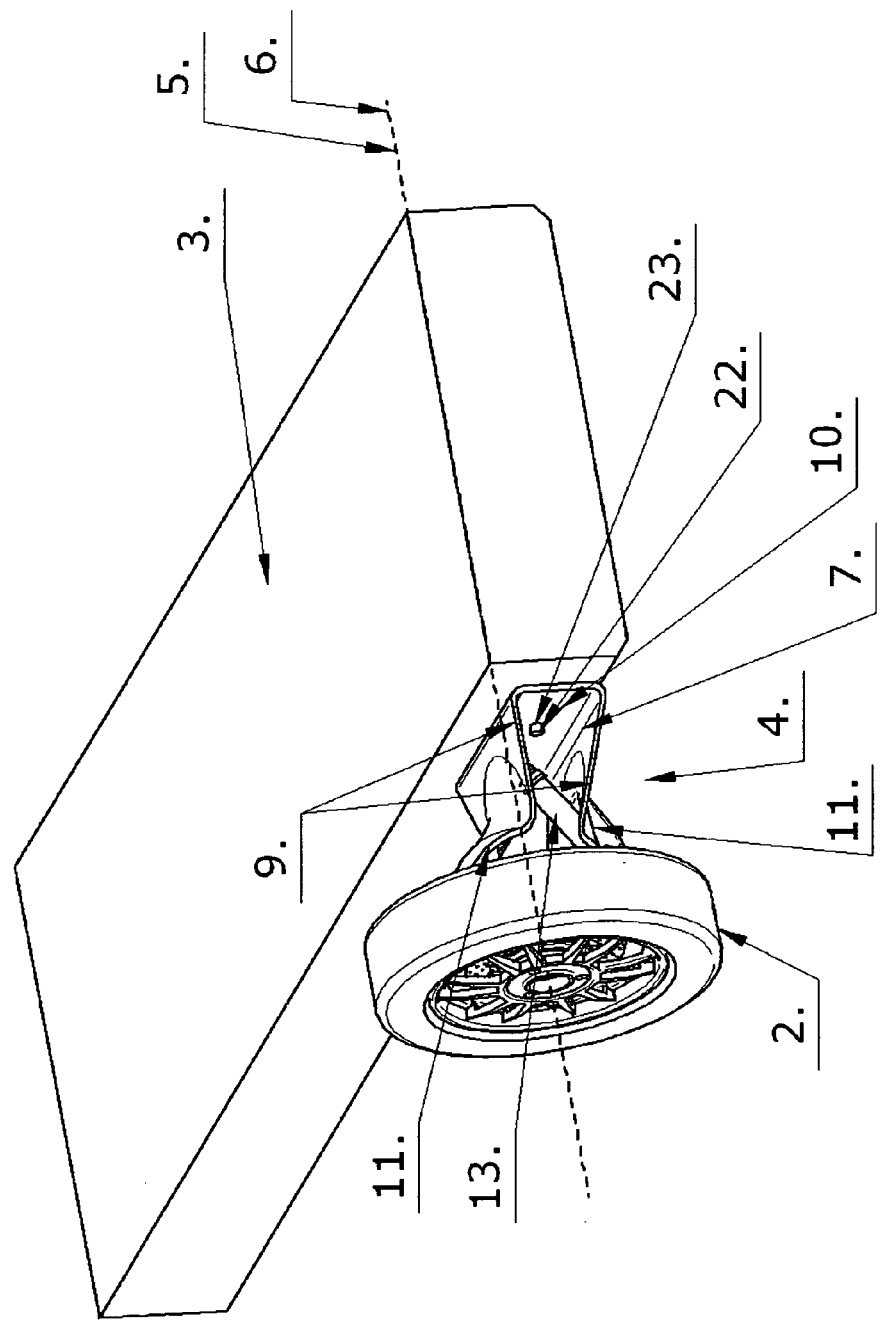
FIG. 6 shows an isometric detailed view of the transport means with a first embodiment of the suspension system in its first orientation.
Figure 7:
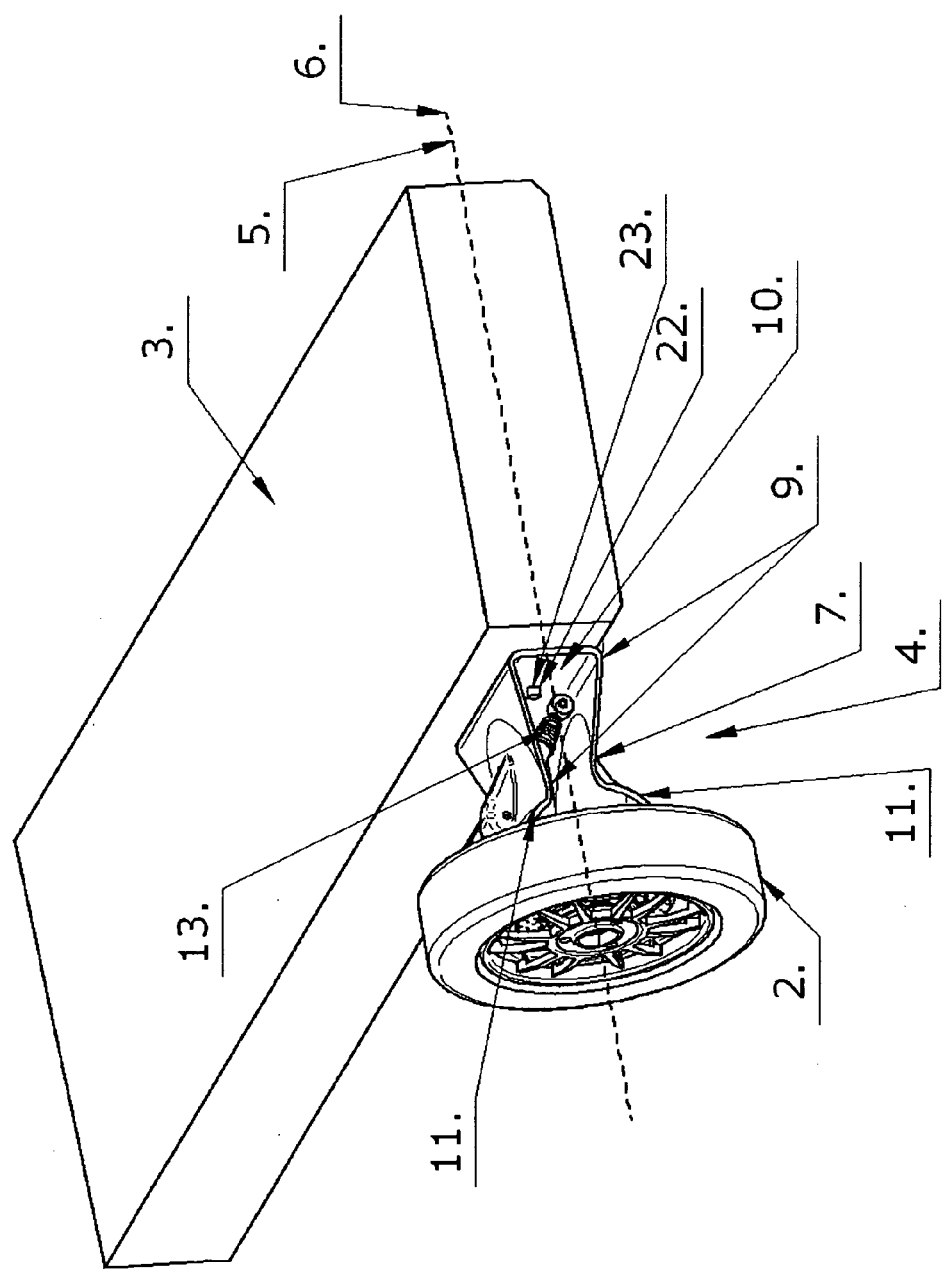
FIG. 7 shows an isometric detailed view of the transport means with a first embodiment of the suspension system in an other orientation.

FIG. 6-7 shows isometric detailed views of the transport means 1 with a first embodiment of the suspension system 4 in its first and second orientations.

The suspension system 4 comprises a U-shaped suspension element 7 with a base 10, legs 9 and free ends 11 (see FIG. 8) orientated towards the wheel 2. The depth of the U-shaped element is greater at the base 10 to provide support against the forces and torsion at the suspension system 4.

The wheel rotates around the wheel rotation axis 5, and the suspension system 4 can be rotated around the suspension rotation axis 6 between the first and the second orientation.

In this specific embodiment the wheel rotation axis 5 and the suspension rotation axis 6 are coinciding. Therefore the ground clearance is unaffected between the two orientations of the suspension system 4.

The damper 13 changes orientation along with the suspension system 4.

FIG. 6 shows the suspension system 4 in the first orientation, providing a first suspension characteristic, e.g. soft suspension.

FIG. 7 shows the suspension system 4 in the second orientation, providing a second suspension characteristic, e.g. hard suspension.

The wheel 2 in FIG. 7, which has an opposite counterpart (not shown) forming a pair of wheels (not shown) are steerable wheels 2. They are able to rotate about a vertical axis for changing the direction of travel of the transport means 1. The wheel rotation axis 5 referred to is when the wheels 2 are not rotated about the vertical axis from 0° position where the wheel rotation axes for the individual wheels in the pair are coinciding and forming one single wheel rotation axis 5.

FIG. 8 shows the U-shaped suspension element 7, with a base 10, legs 9, and free ends 11.

FIG. 9 shows the U-shaped suspension element 7, with a base 10, legs 9, and free ends 11, where the damper 13, the propulsion means 12 and the brakes 17 is provided between the legs 9.

The U-shaped suspension element 7 is shaped such that it is able to take up the forces applied by the wheels 2 (see FIG. 6-7) and propulsion means 12 and transferred to the chassis 3 (see FIG. 6-7).

Figure 10:
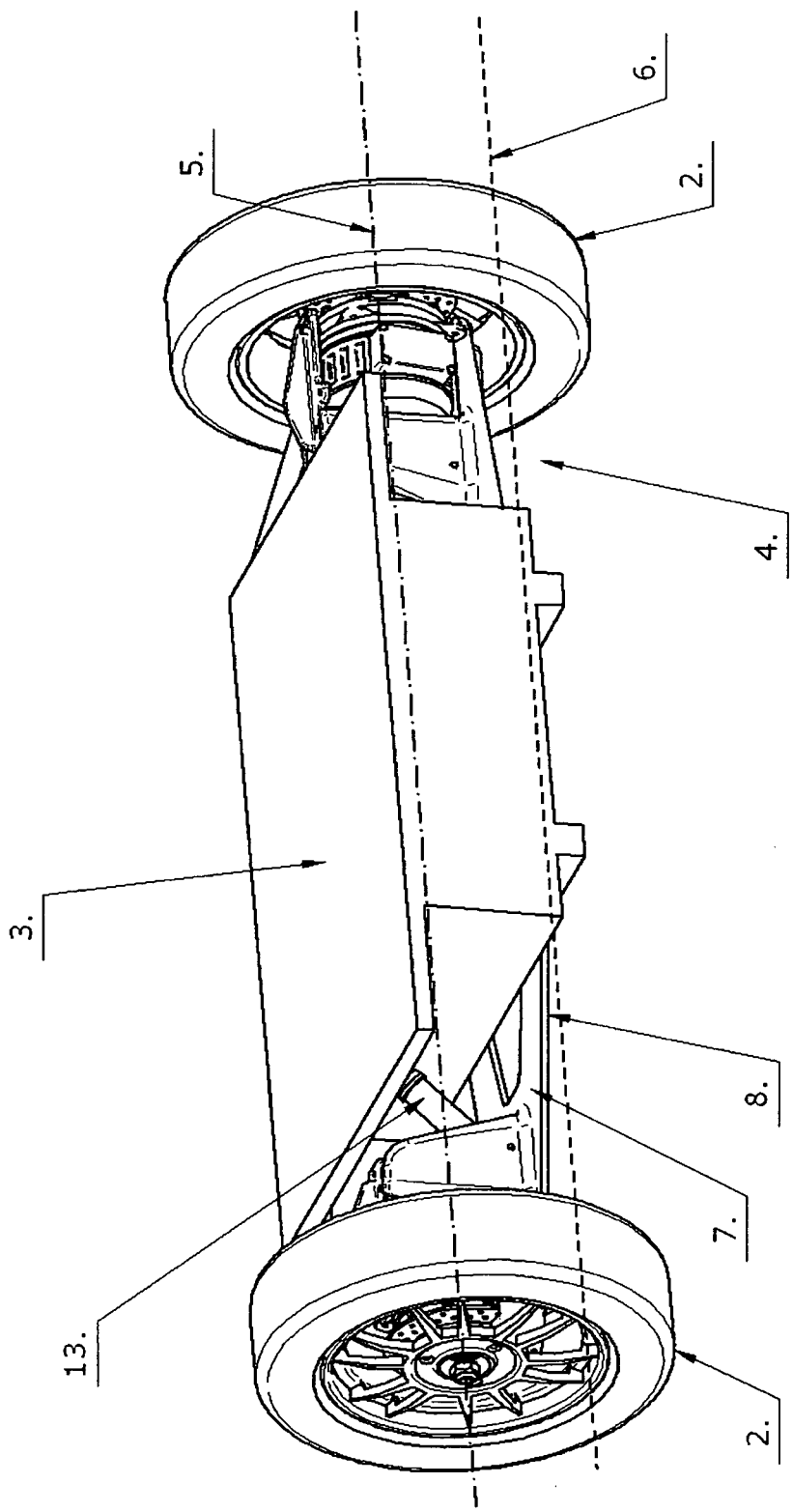
FIG. 10 shows an isometric detailed view of the transport means with a second embodiment of the suspension system in its first orientation.
Figure 11:
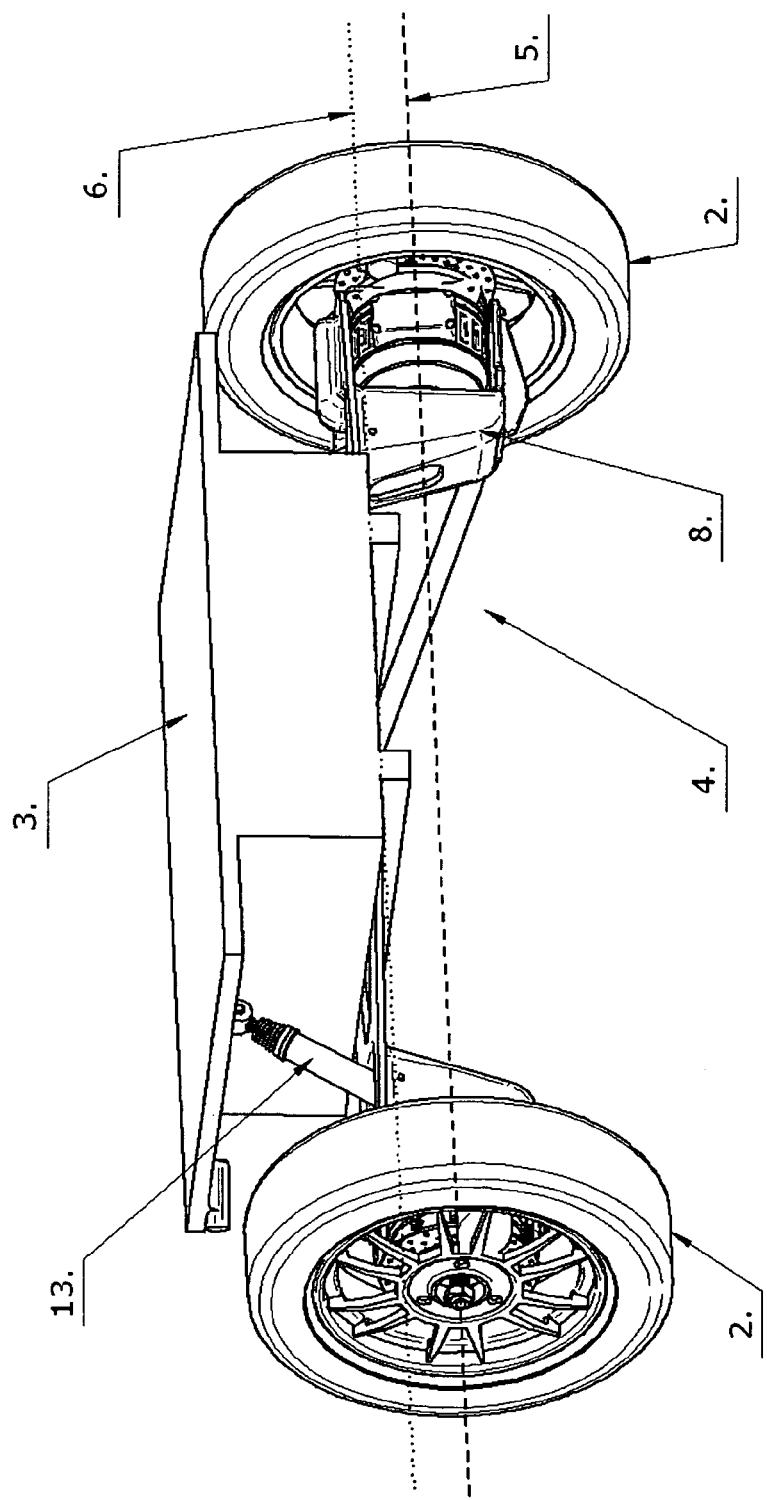
FIG. 11 shows an isometric detailed view of the transport means with a second embodiment of the suspension system in an other orientation.

FIG. 10-11 shows an isometric detailed view of the transport means 1 with a second embodiment of the suspension system 4 in its first and second orientations.

The suspension system 4, comprises a transverse elongate element 8. The wheel rotates around the wheel rotation axis 5, and the suspension system 4 can be rotated around the suspension rotation axis 6 between the first and the second orientation. In this specific embodiment the wheel rotation axis 5 and the suspension rotation axis 6 are separated by a projected absolute vertical distance, which is greater than 0.

The damper 13 does not change orientation along with the suspension system 4.

FIG. 10 shows the suspension system 4 in the first orientation, providing low ground clearance.

FIG. 11 shows the suspension system 4 in the second orientation, providing high ground clearance.

Figure 12:
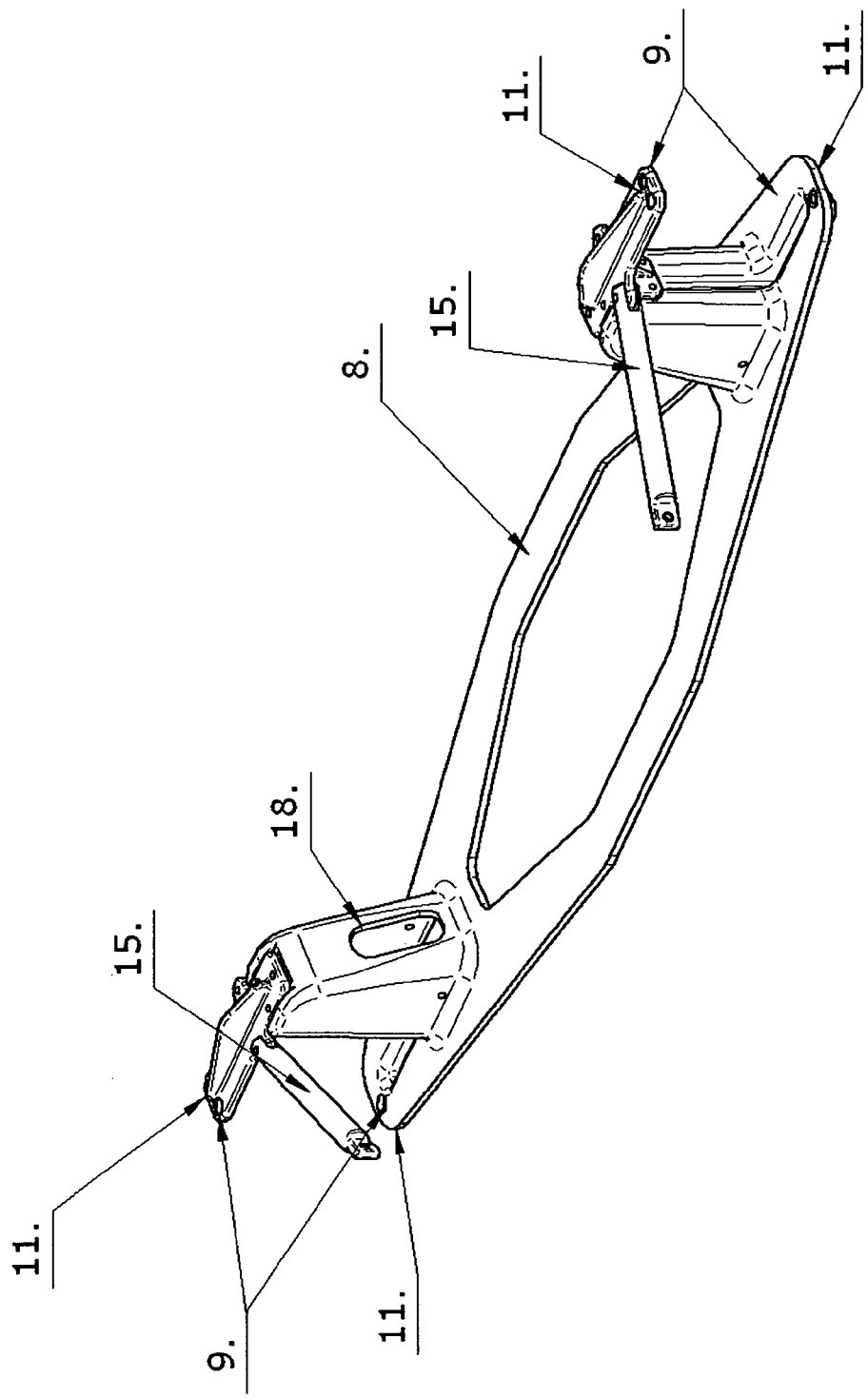
FIG. 12 shows an isometric view of a second embodiment of the suspension system.

FIG. 12 shows the transverse elongate element 8 comprising legs 9 providing free ends 11 towards the wheels (not shown), and a radius rod 15 in either end of the transverse elongate element 8 to take up torsion as the transport means 1 is accelerating and decelerating. An aperture 18 is provided for use with a damper 13 (see FIG. 14) when the suspension system 4 is in the first orientation.

The transverse elongate element 8 act as the spring of the suspension system 4.

Figure 13:
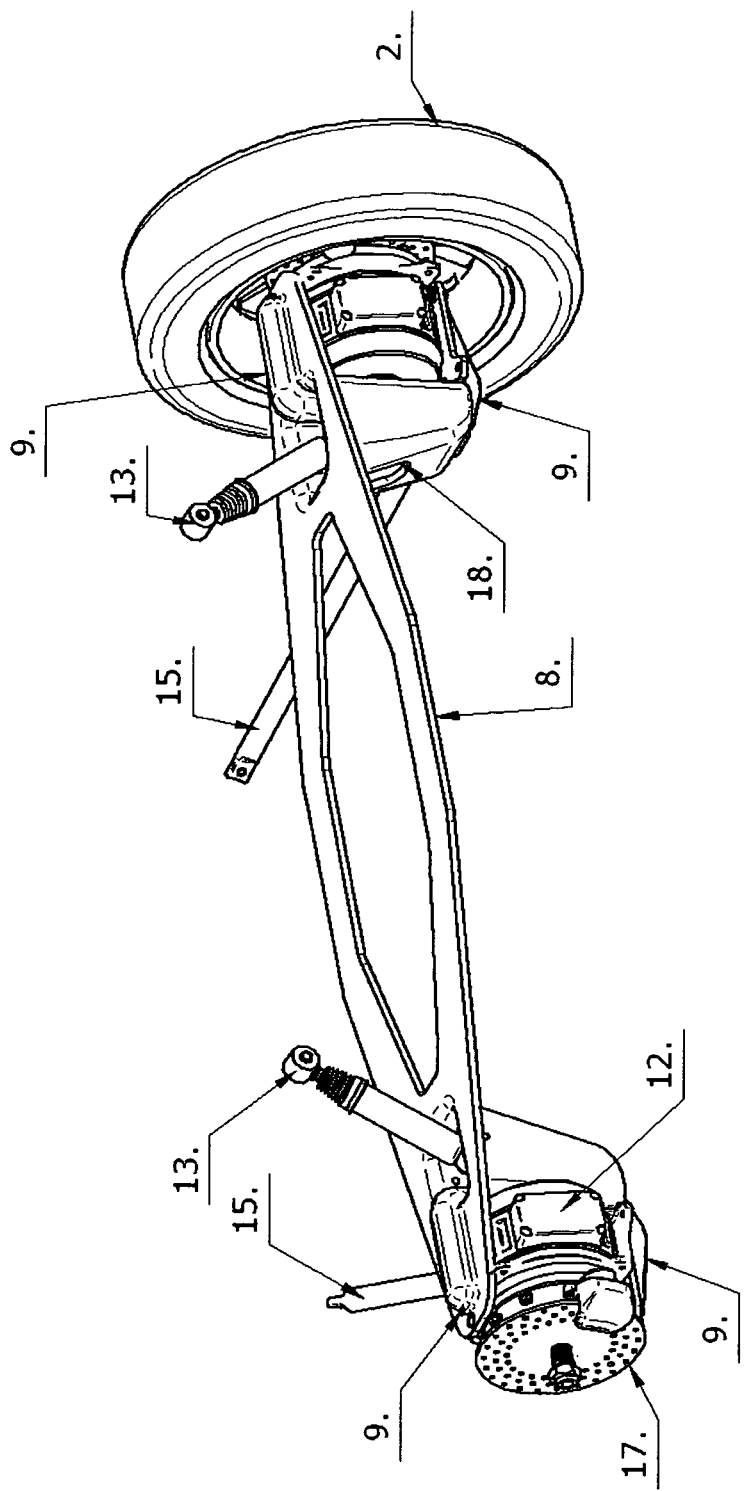
FIG. 13 shows an isometric view of a second embodiment of the suspension system with motor, brakes and shock-absorber in an other orientation.
Figure 14:
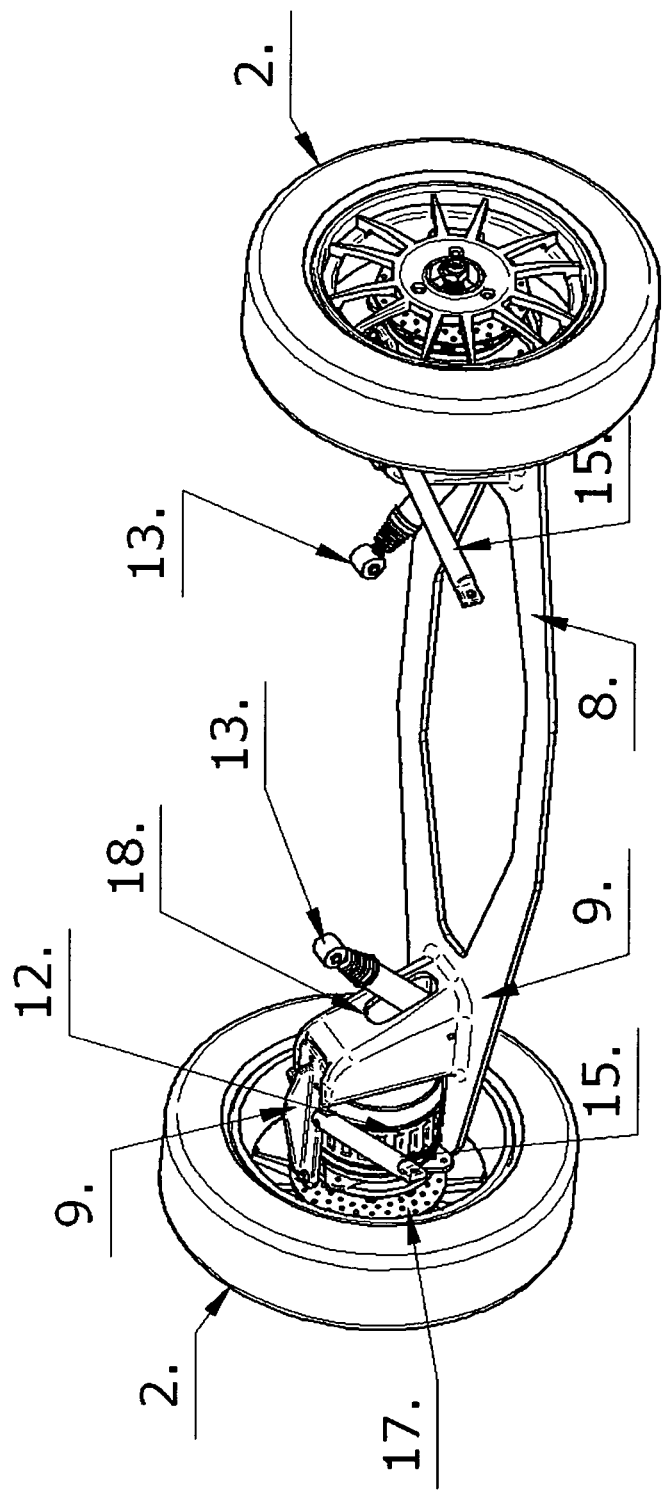
FIG. 14 shows an isometric view of a second embodiment of the suspension system with motor, brakes and shock-absorber in its first orientation.

FIG. 13-14 shows the transverse elongate element 8 comprising legs 9 wherein brakes 17 and propulsion means 12 are provided.

It is seen that in the first orientation (FIG. 14) the damper 13 is provided within the aperture 18 compared to the second orientation (FIG. 13) where the damper 13 is provided with the same orientation but does not extend through the aperture 18.

In all the embodiments of the suspension system 4 the damper 13 is optional. This may be integrated with the U-shaped suspension element 7 or the elongated transverse suspension element 8.

Figure 15:
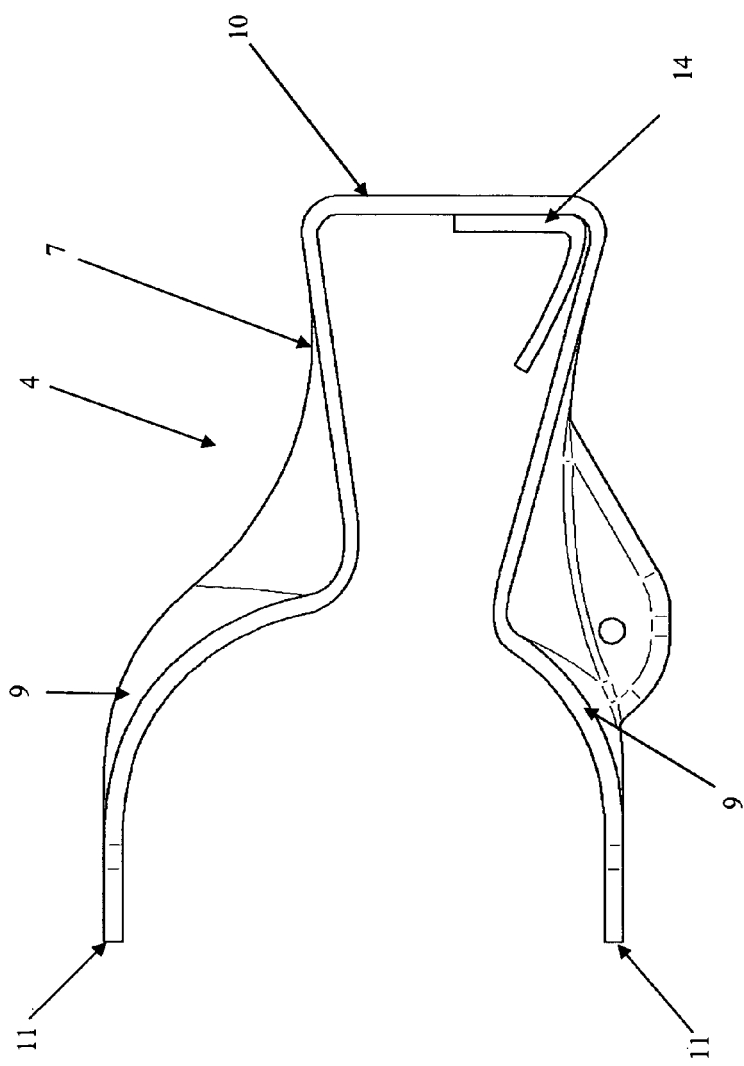
FIG. 15 shows a side view of a first embodiment of the suspension system with an L-shaped element.

FIG. 15 shows a side view of a first embodiment of the suspension system 4 with an L-shaped element 14. The U-shaped suspension element 7 has an inherent spring rate during displacement until the lower leg 9 touches the L-shaped element 14. If the U-shaped suspension element 7 is further displaced the spring rate will change to a combination of the inherent spring rate of the U-shaped suspension element 7 and the spring rate of the L-shaped element. The suspension system 4 will have a progressive spring rate.

The invention claimed is:

1. A transport means (1) comprising:
   at least two wheels (2),
   a chassis (3) with a longitudinal axis, which is substantially parallel to a direction of travel of the transport means (1), and
   at least one suspension system (4) operationally positioned between the chassis (3) and the wheels (2) supporting the chassis, wherein each wheel (2) has a wheel rotation axis (5), which is substantially horizontal, wherein the suspension system (4) includes a connection means (22) that interact releasably with a connection means (23) on the chassis (3), wherein the suspension system (4) has a first orientation, and wherein the suspension system (4) has at least one other orientation which is rotated in relation to the first orientation about a suspension rotation axis (6), which is substantially horizontal and perpendicular to the longitudinal axis of the chassis (3), wherein a suspension characteristic of the suspension system operationally positioned between the chassis (3) and the wheels (2) supporting the chassis is changed by rotating the suspension system about the suspension rotation axis, wherein the rotation angle of the suspension system about the suspension rotation axis is 180°.

2. A transport means (1) according to claim 1, wherein the other orientation is rotated 180° in relation to the first orientation about the suspension rotation axis (6).

3. A transport means (1) according to claim 1, wherein a projected absolute vertical distance between the suspension rotation axis (6) and the wheel rotation axis (5) is greater than 0.

4. A transport means (1) according to claim 1, wherein the suspension system (4) material is chosen among fibre reinforced plastics and metal.

5. A transport means (1) according to claim 1, wherein the said at least one suspension system (4) comprises two separate suspension elements each operationally positioned between the chassis (3) and one of the wheels (2) within said at least one pair of wheels (2).

6. A transport means (1) comprising:
   at least two wheels (2),
   a chassis (3) with a longitudinal axis, which is substantially parallel to a direction of travel of the transport means (1), and
   at least one suspension system (4) operationally positioned between the chassis (3) and the wheels (2), wherein each wheel (2) has a wheel rotation axis (5), which is substantially horizontal, wherein the suspension system (4) includes a connection means (22) that interact releasably with a connection means (23) on the chassis (3), wherein the suspension system (4) has a first orientation, and wherein the suspension system (4) has at least one other orientation which is rotated in relation to the first orientation about a suspension rotation axis (6), which is substantially horizontal and perpendicular to the longitudinal axis of the chassis (3),
   wherein the said at least one suspension system (4) comprises two separate suspension elements each operationally positioned between the chassis (3) and one of the wheels (2) within said at least one pair of wheels (2), and
   wherein the suspension system is a substantially U-shaped element (7), where the base (10) of the U is oriented towards the chassis (3), where the free ends (11) of the U is oriented towards a wheel (2), and where the legs (9) of the U is located one above the other.

7. A transport means (1) comprising:
   at least two wheels (2),
   a chassis (3) with a longitudinal axis, which is substantially parallel to a direction of travel of the transport means (1), and
   at least one suspension system (4) operationally positioned between the chassis (3) and the wheels (2), wherein each wheel (2) has a wheel rotation axis (5), which is substantially horizontal, wherein the suspension system (4) includes a connection means (22) that interact releasably with a connection means (23) on the chassis (3), wherein the suspension system (4) has a first orientation, and wherein the suspension system (4) has at least one other orientation which is rotated in relation to the first orientation about a suspension rotation axis (6), which is substantially horizontal and perpendicular to the longitudinal axis of the chassis (3),
   wherein the said at least one suspension system (4) comprises a transverse elongated element (8), said transverse elongated element (8) comprising primarily U-shaped suspension elements provided in both ends of said transverse elongated element, where the base of each U is oriented towards the chassis (3), where the free ends (11) of each U is oriented towards either wheel (2), and where the legs (9) of the U is located one above the other.

8. A transport means (1) according to claim 1, wherein the transport means (1) comprises propulsion means (12) facilitating the rotation of at least one wheel (2).

9. A transport means (1) comprising:

at least two wheels (2), a chassis (3) with a longitudinal axis, which is substantially parallel to a direction of travel of the transport means (1), and at least one suspension system (4) operationally positioned between the chassis (3) and the wheels (2), wherein each wheel (2) has a wheel rotation axis (5), which is substantially horizontal, wherein the suspension system (4) includes a connection means (22) that interact releasably with a connection means (23) on the chassis (3), wherein the suspension system (4) has a first orientation, and wherein the suspension system (4) has at least one other orientation which is rotated in relation to the first orientation about a suspension rotation axis (6), which is substantially horizontal and perpendicular to the longitudinal axis of the chassis (3), wherein the transport means (1) comprises propulsion means (12) facilitating the rotation of at least one wheel (2), and wherein the propulsion means (12) comprises at least one electric powered motor, said at least one electric powered motor is provided between the legs (9) of a U-shaped suspension element (7), and said at least one electric powered engine facilitates the rotation of at least one of the wheels (2) within said at least one pair of wheels (2).

10. A transport means (1) according to claim 1, wherein each suspension system (4) comprises at least one shock-absorber (13).

11. A transport means (1) according to claim 1, wherein the transport means (1) comprises means for automatically rotating the suspension system (4) between the first and said at least one other orientation.

12. A transport means (1) according to claim 1, wherein the suspension system (4) comprises at least one radius rod (15).

13. A transport means (1) according to claim 1, wherein it comprises a body (16), where the body (16) is interchangeably attached to said transport means (1).

14. A transport means according to claim 13, wherein the body (16) is selected from the group consisting of a body (16) for a one, two, three, four, five, six or more person car, a body (16) for a roadster, a body (16) for a city car, a bus, a truck, a work vehicle, an off road truck and a trailer.

* * * * *